H. Z. COBB.
GOLF BALL.
APPLICATION FILED DEC. 14, 1916.
1,255,388. Patented Feb. 5, 1918.
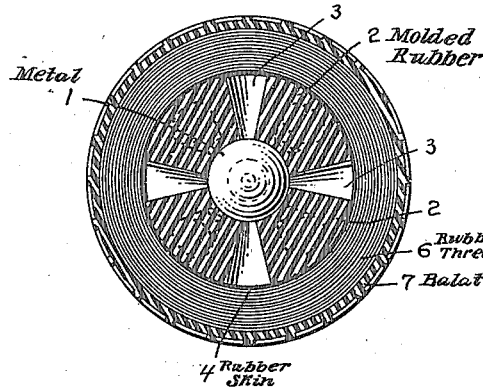
Fig. 1.
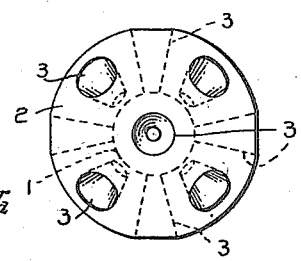
Fig. 2.
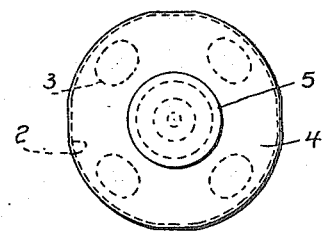
Fig. 3. Fig. 4.
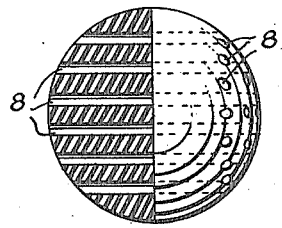
Fig. 5.
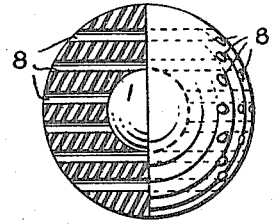
Fig. 6.
Attest:
S. L. Taylor.
Inventor:
Henry Z. Cobb,
by Ernest Hopkinson
his Atty.

UNITED STATES PATENT OFFICE.

HENRY Z. COBB, OF WINCHESTER, MASSACHUSETTS, ASSIGNOR TO REVERE RUBBER COMPANY, A CORPORATION OF RHODE ISLAND.

GOLF-BALL.

1,255,388.    Specification of Letters Patent.    Patented Feb. 5, 1918.

Application filed December 14, 1916. Serial No. 136,869.

*To all whom it may concern:*

Be it known that I, HENRY Z. COBB, a citizen of the United States, residing at Winchester, county of Middlesex, State of Massachusetts, have invented certain new and useful Improvements in Golf-Balls, of which the following is a full, clear, and exact description.

My invention relates to improvements in the construction of resilient balls for playing different games, and is particularly adapted for use in golf balls where the highest resiliency, combined with durability, is necessary. By the use of the construction hereinafter described, I find that a golf ball can be produced which is capable of being driven distances up to fifty yards or more farther than any other golf ball heretofore produced, while at the same time the resiliency is such that the putting qualities are also greatly enhanced. That is, great resiliency only comes into action when the ball is given a heavy blow, as with a brassie or a driving iron, while on the other hand, the effect of a light blow for putting purposes is one resulting in less resiliency and greater accuracy. The method of construction also enables the ball to be manufactured with practically absolute symmetry and balance.

For a detailed description of one form of golf ball which I at present deem preferable, reference may be had to the following specification and to the accompanying drawing forming a part thereof, in which:

Figure 1 is a transverse sectional view of a golf ball made according to my invention;

Fig. 2 is an elevation of the resilient molded rubber portion of the improved ball;

Fig. 3 is a view of the segregated parts of the elastic covering which is put over the molded rubber portion of the ball before the rubber thread is wound thereon;

Fig. 4 is a view of the molded rubber portion of the ball having the thin rubber covering applied thereto;

Fig. 5 is an elevation, partly in section, of a modified form of the molded rubber layer having parallel openings therein; and Fig. 6 is a like view of a similar layer but molded about the metallic core.

Referring to the drawing, the numeral 1 indicates a solid metallic core, such as an accurately made ball of steel, iron or other preferred metal. About this central core is molded a layer of rubber composition 2 or other elastic compound, which is vulcanized directly on the metallic core 1. This layer of rubber composition is provided with a plurality of symmetrically placed pockets or holes 3 which may extend through the composition to the metallic core, or only partly therethrough. It is necessary, however, that a number of these holes, preferably six, extend to the sides of the metallic core or ball in order that the pins which form the holes in the rubber composition may accurately hold the metallic core in position within the mold. The total number of holes in the ball may be varied according to the weight of the ball desired and the nature of the compound, but I have found that fourteen is the preferable number,—that is four holes or pockets on the equatorial circumference, and five holes on each hemisphere. After the composition has been molded or vulcanized about the central core, the ball thus far formed is preferably covered with a thin layer or skin of vulcanized rubber, similar to that used in the manufacture of toy balloons. This may be applied in any desired way, but I prefer to form a small bag or balloon by the well known dipping process employed in forming such thin sheets, of approximately the size of the sphere upon which it is to be placed, as indicated by the numeral 4 in Fig. 3. This when placed about the vulcanized rubber layer illustrated in Fig. 2, closely adheres to the same and is completed by cementing thereon a thin rubber cap, indicated by the numeral 5 in Fig. 3. The spherical body thus formed is then wound with rubber thread, indicated by the numeral 6, stretched nearly to breaking point in any well known manner familiar to those skilled in the art. An outer layer of plastic material is then molded on the rubber thread, as indicated by the numeral 7. For this purpose I prefer to use balata which has been freed of resinous impurities, after which the ball may be painted or enameled any desired color.

In Fig. 5 I have illustrated a form of rubber or other elastic material which is provided with a series of straight holes 8 passing entirely through the ball in a direction parallel to the one major axis, and in Fig. 6 I have shown the same construction used in connection with a metallic core, similar to that shown in Fig. 1 of the drawing. The composition is applied to the metallic core by molding the same as a complete homogeneous layer since the ball may be more accurately balanced by this construction than where the parts are first molded and then applied by the use of cement.

I have found that there is no difficulty in removing a ball made as illustrated in Figs. 1 and 2 from the mold in spite of the fact that the pins which form the air pockets converge toward the center. The air pockets thus formed are hermetically sealed by the thin jacket 4 of substantially pure rubber which incloses the molded rubber, thus confining the air and preventing the same from leaking out when the ball is distorted under pressure from the blow of a golf club, or other force. However, this thin rubber jacket may be omitted if the pockets are accurately and tightly covered by the layers of rubber thread wound thereon. I have found, however, that the molded layer is liable to less distortion when covered by a thin jacket of rubber.

The use of the thin rubber jacket also allows internal adjustment of the molded elastic layer as regards the rubber thread wound thereon, thereby permitting equalization of the strains and pressure produced by the tension of the rubber thread. The tension of the thread also compresses the molded layer so that the air contained in the pockets is maintained under considerable pressure in the completed ball, thus greatly increasing its resiliency and liveliness. In either form of the ball the metallic core may be omitted if preferred, and the necessary weight accurately obtained by employing the requisite ingredients in the compound.

I do not wish to be understood as being limited to the precise form of the holes or air pockets illustrated in the drawing as these may be arranged in other ways, according to the preference of the manufacturer.

Having thus described these forms of my invention, what I claim and desire to protect by Letters Patent is:

1. A resilient ball comprising a metallic core, a layer of elastic composition molded thereon and having a plurality of closed air pockets in said composition, and an elastic layer under tension for maintaining said elastic composition and the air in said pockets under high compression.

2. A resilient ball comprising a metallic core, an intermediate layer of elastic composition molded thereon, and having therein a plurality of air pockets, a thin layer of vulcanized rubber on said intermediate layer for closing and sealing the ends of said air pockets, and an elastic layer under tension for maintaining said elastic composition and the air in said pockets under high compression.

3. A resilient ball comprising an internal layer of elastic composition having therein a plurality of outer air pockets, a layer of rubber thread wound thereon under high tension and covering said pockets, and an external protective coating of plastic material.

4. A resilient ball comprising a metallic core, an intermediate layer of elastic composition molded thereon and having a plurality of air pockets, a layer of rubber thread wound thereon under high tension and covering said pockets, and an external protective coating of hardened plastic material.

5. A resilient ball comprising a metallic core, an intermediate layer of elastic composition molded thereon and having therein a plurality of air pockets, a thin layer or jacket of pure rubber compound, a layer of rubber thread wound over said jacket under high tension, and an outer protective coating of hardened plastic material.

6. A resilient ball comprising, a layer of elastic composition having molded therein a plurality of air pockets, a winding of rubber thread under high tension thereon, said layer and the air in said pockets being compressed by the winding of rubber thread.

7. A resilient ball comprising, a layer of elastic composition having molded therein a plurality of air pockets, a thin cover or jacket of vulcanized rubber for closing and sealing said pockets, a winding of rubber thread under high tension on said jacket, said layer and the air in said pockets being compressed by the winding of rubber thread.

8. A resilient ball comprising a metallic core, a layer of elastic composition molded thereon and having therein a plurality of outer air pockets, and a winding of rubber thread under high tension adapted to compress said rubber composition and the air within said pockets.

9. A resilient ball comprising a metallic core, a layer of elastic composition having a plurality of outer air pockets molded therein symmetrically around said core, a layer of rubber thread wound thereon under high tension, and an external layer of balata molded on said layer of rubber thread.

10. A resilient ball comprising an internal mass of elastic composition having a plurality of external air pockets molded therein symmetrically around the center of the same, a layer of rubber thread wound thereon under high tension, and an external layer of balata molded on said layer of rubber thread.

11. A resilient ball comprising a metallic core, a layer of elastic composition having a plurality of external air pockets molded therein symmetrically around said core, a thin cover or jacket of vulcanized rubber for closing and sealing said pockets, a layer of rubber thread wound thereon under high tension, and an external layer of balata molded on said layer of rubber thread.

Signed at New York, county and State of New York, this 13th day of December, 1916.

HENRY Z. COBB.